AMPLITUDE ELIMINATION AND RESTORATION SYSTEM

Filed April 8, 1964 3 Sheets-Sheet 1

INVENTOR.
JOSEPH A. VASILE

BY

OSTROLENK, FABER, GERB & SOFFEN
ATTORNEYS

AMPLITUDE ELIMINATION AND RESTORATION SYSTEM

Filed April 8, 1964 3 Sheets-Sheet 2

INVENTOR.
JOSEPH A. VASILE

BY

Darby, Faber, Gerb & Soffen
ATTORNEYS

AMPLITUDE ELIMINATION AND RESTORATION SYSTEM

Filed April 8, 1964 3 Sheets-Sheet 3

INVENTOR.
JOSEPH A. VASILE
BY
OSTROLENK, FABER, GERB & SOFFEN
ATTORNEYS

United States Patent Office 3,517,313
Patented June 23, 1970

3,517,313

AMPLITUDE ELIMINATION AND RESTORATION SYSTEM

Joseph A. Vasile, 4 Thorp Lane, Norwalk, Conn. 06850

Filed Apr. 8, 1964, Ser. No. 358,360
Int. Cl. H04k 1/00
U.S. Cl. 325—32 18 Claims The instant invention relates to communication links of the radio telephone type which permits the separation of frequency and amplitude information in a voice frequency transmission. Parallel transmission of the phase and amplitude informataion over the transmission channel with all of the components thereof being in reference amplitude, and ultimate restoration of the dynamic amplitude range at the receiver facility, provides an effective power gain of 200 (23 db) and a privacy feature capable of completely masking the intelligence transmitted to the casual listener.

It has long been a desire to provide communication links with a high degree of privacy. This is extremely important in military application wherein interception of communications can have extremely detrimental results. In such communications systems, it is also desirable to provide links having the requisite privacy in which the encrypted information may be simply and inexpensively encoded and decoded; may not be decoded without extreme difficulty by the casual listener; and may be transmitted over facilities having an extremely poor signal-to-noise ratio. The present day systems which have been designed, have always been found to be lacking in at least one of the above mentioned requirements.

It is therefore one object of the instant invention to provide a system having the requisite effective power gain and privacy in which the above mentioned requirements are all present in their optimized states.

The instant invention is characterized by providing a radio telegraph link which is preferably designed with a two-wire to four-wire interface between the telephone and radio or microwave link. The interface is normally provided with a hybrid means such as, for example, a transformer hybrid. The telephone link is a typical two-wire link capable of being employed for either transmission or reception. The radio or microwave link is comprised of separate send and receive carrier channels. The send carrier channel is connected to the interface hybrid means and has amplifier means for amplifying the incoming voice signals to a level insuring maximum loading of the distant end receiver.

The voice signals so amplifier then undergo single side band modulation about a predetermined carrier frequency. The single sideband modulated signals then undergo a limiting operation so as to transform the voice signals to constant amplitude level signals whose frequency varies in accordance with the original voice signals. The output of the initial amplifier means passes through second and third branches within the send carrier channel wherein the second branch comprises frequency shift modulation means which generates analog frequency shifted information representative of the amplitude of the original voice signals to be transmitted. The constant amplitude single side band modulated/demodulated information is combined with the frequency shifted information in suitable mixing means and is transmitted via suitable radio transmitter means to the remote location.

In addition to the above information which is transmitted to the remote location, it is further possible to transmit binary MARK and SPACE signals to the remote location for the purpose of conditioning the receiver facility at the remote location for either receive or idle operation. The MARK and SPACE tones are digital signals generated by frequency shift keying means in the third branch mentioned previously which is controlled by the signal level of the initial amplifying means mentioned previously.

The modified speech information which is transmitted is noncomprehendible (since constant amplitude signals are transmitted) and they may be placed into coherent understandable form only by means of equipment compatible with the equipment provided in the transmit carrier channel. In addition to the signals being noncomprehendible, the communications system is highly protected against any effects of fading.

The receive carrier channel is comprised of first, second and third branches which may be likened substantially to the first, second and third branches, respectively, of the transmit carrier channel. The receive signals, after being suitably limited, enter the first branch which is provided with suitable modulation/demodulation means of the single side band type. Signals are then impressed upon a variable gain output amplifier means. The second branch is comprised of an analog frequency shift demodulation means capable of generating a voltage signal dependent upon the frequency of the incoming amplitude information which is in the form of frequency shifted signals. The analog output voltage is employed for the purpose of driving the variable gain output amplifier so as to reinsert the amplitude information into the original voice signals. The output of the amplifier means is therefore the reconstructed voice signals which is then impressed upon the interface hybrid means for subsequent impression into the two-wire telephone link. The third branch of the receive carrier channel is comprised of suitable frequency shift keying means responsive to binary digital information for the purpose of enabling or disabling, respectively, the receive channel. It should be further understood that upon the receipt of space tone information, in addition to enabling the amplifying means in the receive channel, operates the switch means so as to disable the amplifying means in the transmit channel, thereby preventing simultaneous operation of both the receive and transmit channels in the four-wire link. A hybrid balance approaching infinity is thus provided eliminating singing and echoes.

The radio telephone link being so designed provides privacy within the communications system preventing the casual listener from deciphering voice signals transmitted due to the complete absence of amplitude information in the voice signals. Due to the fact that all transmitted signals are amplitude limited and are therefore amplitude constant, this enables maximum loading of the receiver facility, overcomes any effects of fading upon the transmitted information and thereby insures maximum signal-to-noise ratio for transmitted signals.

In order to further enhance the privacy of the system, a noise generating means a few db below reference speed amplitude may be employed to provide continuous random transmission. By continuously transmitting in this manner, the casual listener has no indication of when actual voice transmission is initiated or terminated, thereby further complicating the function of deciphering intercepted signals in any attempt by the interceptor to render them intelligible.

Still further privacy may be injected into the system by injecting predetermined quantities of delay into predetermined voice frequency bands. This is affected by providing a plurality of frequency channels limited by suitable frequency means to pass only predetermined ranges of frequency. The outputs of each of the frequency channels are connected by suitable switching or gating means to predetermined delay circuits in order to inject predetermined delays upon each of the frequency channels. The switching means which connects the voice frequency channels to predetermined delays may be actuated and controlled by conventional Teletype encrypter means (key generator), thereby providing a substantially "random" pattern in the voice frequency channels transmitted. A delay pattern generated in this manner presents to the interceptor the same almost insuperable problems of deciphering, as is the case in encrypted Teletype. Encryption can be still further enhanced by means of switching narrow band segments of the audio signal by straight and inverted translation. The introduction of delay into the transmitted speech permits heavier loading of the output transmitter with consequent signal-to-noise ratio improvement of the received signal at the distant end.

In telephone carrier voice multiplex applications, the instant invention may be employed in an extremely advantageous manner. For example, in communications systems comprised of voice channel multiplex equipment having, for example, twelve channel groups which are combined to form super groups of up to six hundred channels for transmission over coaxial or microwave wide band transmission systems, 23 db of signal-to-noise improvement is possible through the use of the amplitude elimination and restoration system. The channel capacity through use of this system can be increased by a factor of two to three times (provided sufficient band width is available) because the base band noise requirements can be relaxed 20 db or more.

It is therefore one object of the instant invention to provide a communications system for two to four-wire links and the like having novel means for providing effective power gain.

Another object of the instant invention is to provide a communications system for two to four-wires radio telephone links and the like providing an amplitude elimination of the voice signal in the transmission channel in order to provide power gain and system privacy.

Still another object of the instant invention is to provide a communications system for two to four wire radio telephone links and the like having novel means for restoration of voice signal amplitude in the receive channel of the four-wire system.

Another object of the instant invention is to provide a communications system having a novel transmit channel for transmitting frequency shift signals representative of the voice signal amplitude along with modified signals having a frequency or phase representative of the voice signal frequency to generate a composite constant amplitude signal noncomprehendible with the original voice signal so as to insure system privacy.

Still another object of the instant invention is to provide a communications system for two to four-wire links and the like comprising a send channel and having means for generating single sideband signals representative of the voice signal frequency and for generating frequency shift signals representative of the voice signal amplitude together with means for combining said signals, thereby generating a composite signal noncomprehendible with the original voice signal to insure system privacy.

Still another object of the instant invention is to provide a receive channel for two to four-wire radio telephone links and the like comprising means for receiving amplitude eliminated voice signals and having novel variable gain amplifier means controlled by analog frequency shift keying receiver means for restoring the voice signal amplitude, so as to reconstruct the original voice signal transmitted.

Still another object of the instant invention is to provide novel means for encrypting amplitude eliminated voice signals comprising a plurality of channels for respective voice frequency ranges and means for encryptedly connecting a plurality of delay means of differing values to each of said voice frequency ranges of said channels in order to prevent the deciphering of transmitted information.

Still another object of the instant invention is to provide novel encrypting means for amplitude eliminated voice signals and the like comprising means for dividing the voice signal band width into a plurality of discrete frequency ranges, means for encrypting each of said frequency ranges in a random manner to a plurality of differing delay circuits and means for providing frequency translation of both the direct and inverted type to further enhance the complexity of the encrypted meessage being transmitted.

Still another object of the instant invention is to provide a multiplex communications system having a plurality of multiplex voice channels wherein said voice channels undergo amplitude elimination and restoration in the send and receive channels, respectively, in order to greatly increase the channel capacity of the multiplex system.

These and other objects of the instant invention will become apparent when reading the accompanying description and drawings in which.

Figure 1:
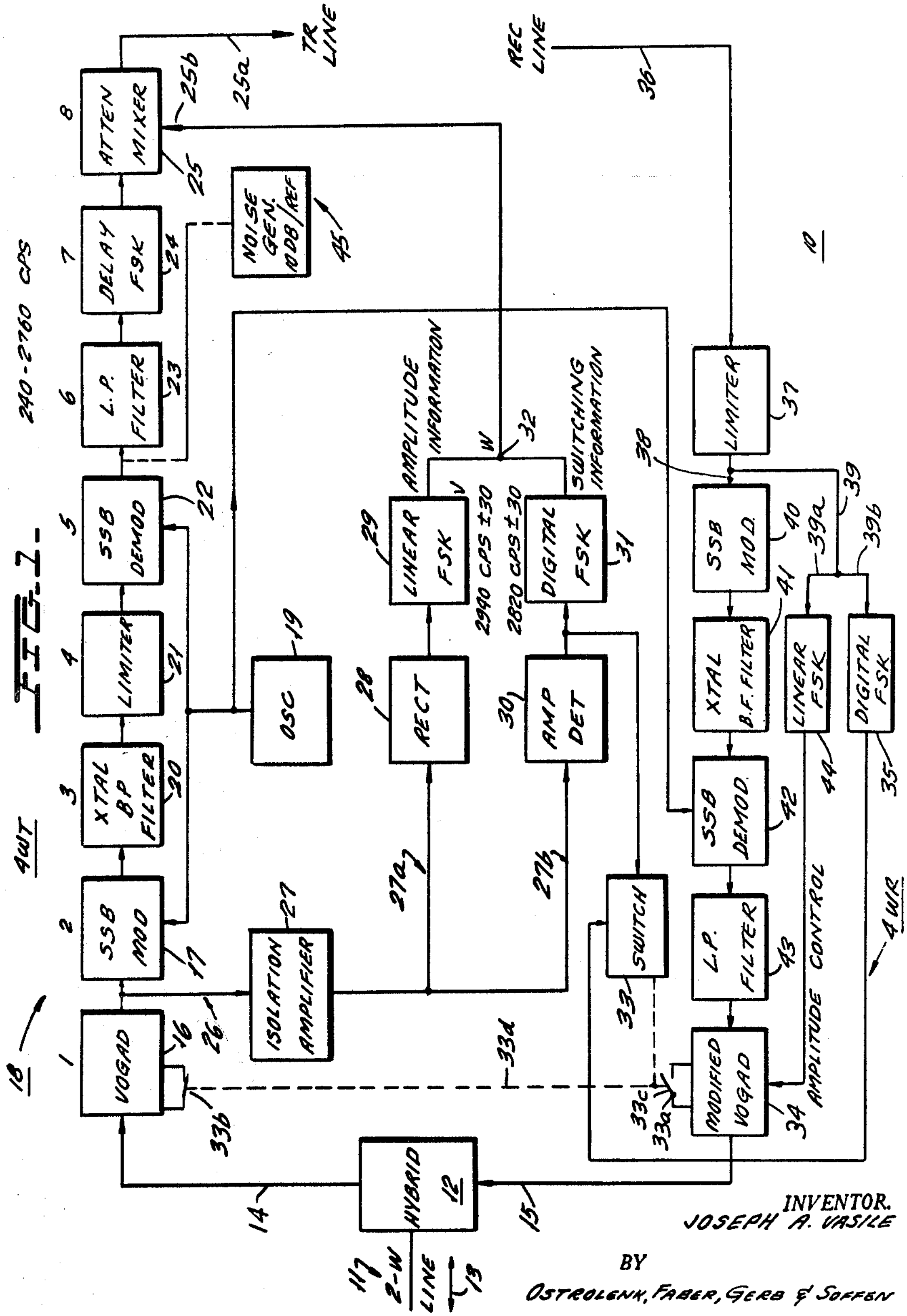
FIG. 1 is a block diagram showing a two to four wire terminal designed in accordance with the principles of the instant invention.

Referring now to the drawings, FIG. 1 shows a block diagram of the amplitude elimination and restoration system of the instant invention. The system 10 is comprised of a two-wire link 11 and a four-wire link comprised of a two-wire transmit channel 2WT and a two-wire receive channel 2WR. The four-wire link comprised of channels 2WT and 2WR are connected to the two-wire line 11 by hybrid means 12. Hybrid means 12 is typically a hybrid transformer normally employed in such radio telephone links and which is designed to provide suitable impedance matching between the radio and the telephone links. The two-wire or telephone line 11 is capable of performing either transmission or reception as represented by the double arrow line 13. In the case of the radio channels, when the two-wire line 11 is transmitting voice signals, these signals are passed through the hybrid to output line 14 which connects with the transmit channel 2WT. In the case where signals are being received through the receive channel 2WR, after suitable demodulation and amplitude restoration, these signals are impressed upon line 15 which is, in turn, coupled to an input to hybrid 12, which subsequently impresses the voice signals upon the two-wire line 11.

Considering first the send channel 2WT of terminal 10, the channel is comprised of a variable output gain amplifier 16 whose output is constant at a predetermined output value with input variations of approximately 45 db. The speech from the subscriber on the two-wire line 11 arrives at hybrid 12 at levels which may vary between zero VU and minus 45 VU, depending upon subscriber loop losses and the subscriber's volume into the telephone mouth piece. The hybrid 12 adds 3.2 db loss before reaching the input of amplifier 16. The purpose of amplifier 16 is to permit maximum loading of the radio transmitter (not shown) in order to provide optimum signal-to-noise ratio at the receiving end which is provided at some remote location. For the voice signal to be applied directly to the transmitter facility, a signal-to-noise ratio at the distant end receiver of at least 25 db would be required in order to make audible the useful weak parts of speech.

The voice transmission at reference amplitude is then applied to a conventional balanced modulator 17 in the branch 18 of the transmit channel 2WT. The modulator 17 may be designed to operate about a central frequency, supplied by oscillator 19, which will be selected within the range of 32 kc. to 3,000 kc. and is typically determined by the economics and physical requirements of the system or due to the consistency requirements for operation with similar equipment. In the example of FIG. 1, it will be assumed that the oscillator frequency of oscillator 19 which drives the system is 1750 kc. This means that the modulator output of balanced modulator 17 will be 1750 kilocycles plus and minus the voice frequency range of 240 to 2,640 c.p.s. The output of modulator 17 is impressed upon a crystal band pass filter 20 which is selected to pass the upper sideband about the carrier which is the frequency range 1750.240 kc. to 1752.640 kc.

The output of filter means 20, the amplitude of the single sideband modulated signal, contains the full dynamic range of the input voice signal which for practical applications can be considered to be 30 db. This voice signal then drives the limiter means 21 which is so designed as to provide a constant output for all signals impressed thereon from reference to those 30 db below the reference amplitude, thus generating a constant amplitude output signal at the output of limiter means 21. The resulting output signal will be distorted by many harmonics of the input, but since these are multiples of intermediate frequencies lying in the range of 1750.240 to 1752.640 kc., these harmonics will not affect the integrity of the ultimate output signals for a reason to be more fully described.

The output of limiter means 21 is impressed upon a single sideband demodulation means 22, which being operated by the same oscillator means 19 which operates the single sideband modulator 17, causes the signals to be returned to the initial voice frequency range plus the harmonics generated due to the action of limiter means 21. The demodulated signals are then impressed upon the low pass fister means 23 which is designed to pass signals lying in the frequency range from 240 to 2760 c.p.s., so that none of the generated harmonics will pass the low pass filter means 23. The resulting output signal is then impressed upon delay means 24 with the amount of delay which the signals undergo being equal to the delay of the narrow band filters (100 c.p.s.), which transmits the voice signal amplitude information in order to insure synchronization of the frequency and amplitude signals in a manner to be more fully described.

The delayed signals are then impressed upon a mixing pad 25 providing suitable impedance matching means for the signals combined therein. The mixing pad output appearing at 25*a* may be amplified, if necessary, before the ultimate transmission thereof to the "transmit" landline or microwave or other carrier facility connecting the radio telephone terminal 10 to the radio transmitter (not shown).

The output of the amplifier means 16 is also directed to a second branch 26 in the send channel 2WT and then is impressed upon an isolation amplifier 27. The output of amplifier means 27 is, in turn, divided into first and second paths 27*a* and 27*b*, respectively. The voice signals in path 27*a* are impressed upon rectifier means 28 for the purpose of generating a varying DC waveform which corresponds in amplitude to the dynamic range of the output voice signal from the amplifier means 16. This varying DC output is in turn impressed upon analog frequency shift modulaitng means 29, which is designed to produce an output varying in frequency as a function of the rectifier output voltage (or current). A chart of possible design values is as follows:

| VOGAD (16) output DB/m. | Rectifier (28) output volts or ma. | Frequency shift oscillator (29) frequency, c.p.s. |
|---|---|---|
| Ref.: | | |
| 0 | 100 | 2,970 or 2,910 |
| −3 | | |
| −6 | 50 | 2,940 or 2,914 |
| −9 | | |
| −12 | 25 | 2,925 or 2,918 |
| −15 | | |
| −18 | 12.5 | 2,918 or 2,925 |
| −21 | | |
| −24 | 6.25 | 2,914 or 2,940 |
| −27 | | |
| −30 | 3.125 | 2,910 or 2,970 |
| −40 | 1 | |
| −50 | 0.3 | 2,905 or 2,975 |

The frequency shift output of frequency shift modulating means 29 is adjusted to generate a substantially constant amplitude which is approximately 10 db below the reference amplitude of the composite voice signal at the output 25*a* of the attenuator mixing pad 25 in the case where 16 independent voice frequency components were provided. These constant amplitude speech components and amplitude information signals from the analog frequency shift oscillator 29 would all be transmitted with equal amplitude. In the example of FIG. 1, the analog frequency shift modulating means which can be seen from the chart set forth above is designed to operate at a center frequency of 2940 c.p.s. with a plus or minus (+ or −) 30 c.p.s. deviation therefrom.

The second sub-branch 27*b* of branch 27 impresses the voice signals upon the amplifier detector means 30 which is designed to produce a DC output voltage adequate to operate the binary frequency shift keying means 31. The output signal of detector means 30 operates the binary frequency shift keying means 31 to MARK frequency 2850 c.p.s., when its input amplitude exceeds a weak voice signal 21 db below reference signal or higher. It will likewise operate the digital frequency shift keying means 31 to SPACE frequency 2790 c.p.s. when the amplifier detector means 30 output signal represents a voice signal from amplifier means 16 which is 24 db below reference, or lower. A time constant of approximately 0.16 seconds hangover is provided in the release operation of the keying means 31.

The output of the binary frequency shift keying means 31 is combined with the analog frequency shift modulating means 29 at terminal 32 where, in turn, the combined signals are impressed upon a second input to the attenuating mixing pad 25. The delay imposed upon the voice frequency signals by the delay means 24 acts to provide synchronism as between the output of keying means 29 and the voice frequency signals passed by delay means 24.

Typically, radio telephone terminals of the type 10, shown in FIG. 1, are usually designed to permit transmission in only one direction at a time. In one embodiment, transmission over the "receive path" is given priority such that the "send" path is shorted out in the absence of speech. In the other typical type, the terminal permits transmission over the "send" path under normal operation and the "receive" path is shorted out in the absence of speech. The terminal 10, shown in FIG. 1, is of the latter type, such that in the absence of speech the "send" path 2WT is normally conducting. The amplifier-detector 30 serves the local function of operating the local terminal send-receive switch means 33 in accordance with the voice signal output amplitude appearing at the amplifier means 16. The arrangement is such that the send-receive switch means 33, which is mechanically coupled to the receive switch 33*a* by the mechanical linkage 33*d*, acts to keep the arm 33*c* of receive switch 33*a* in the closed position when the output of amplifier 16 exceed minus 21 db in a diagonal line REF and to permit the "receive" switch 33*b* (of similar design to 33*a*), to be open at this time; and to short switch means 33*b* and open circuit switch means 33*a* when the amplifier means 16 transmits an output signal which falls below the minus 24 *db* in a diagonal line REF for more than 0.16 seconds. This operation occurs providing the binary frequency shift keying means receiver in the receive channel 2WR, which is to be more fully described, is in the MARK condition from the corresponding distant end transmission.

The operation of the switching means 33 is such that when even weak voice signals are impressed in the send channel 2WT, detector 30 generates a DC signal of sufficient level to operate switch means 33 to close switch 33*a* and open switch 33*b*. This connects the output of the amplifier means 34 in receive channel 2WR to ground thus preventing any possible unwanted signals or noise from reaching hybrid means 12. At the same time switch 33*b*, is open, enabling amplifier means 16 to operate in a normal fashion.

Where the voice signals impressed upon line 14 fall below even the "weak" voice signal level, amplifier detector means 30 operates switch means 33 to open circuit switch 33*a* and close switch 33*b*, thereby connecting the output of amplifier means 34 in receive channel 2WR to pass any received voice signals to hybrid 12. In order for the amplifier means 34 to be so enabled a MARK condition must be impressed upon the second input to switch means 33 by the binary frequency shift keying means 35 provided in the receive channel 2WR and which operates in a manner to be more fully described.

The receive channel 2WR is comprised of an input line 36 which may be connected to any suitable receiver means and which impresses the ampltiude eliminated voice signals upon limiter means 37. Limiter means 37 provides suitable gain for the incoming signals with the output thereof being a constant amplitude signal. The signals so amplified are simultaneously impressed upon the first or main signal branch 38 and the second branch 39. As regards branch 38, the output signals are first impressed upon a single sideband modulator means 40 which operates at the oscillator carrier frequency of oscillator means 19 which is employed to operate modulating means 40. The output signals are then impressed upon crystal filter means 41 which passes the upper frequency band. The upper frequency band is then impressed upon the demodulator means 42 which is likewise operated about the central frequency of oscillator means 19. The demodulated output is then impressed upon a low pass filter means 43 which low pass signals lie in the audio frequency range and are impressed upon one input of the variable output gain amplifier means 34.

The analog and binary frequency shift signals which are attenuated by the band pass filter means 41 in branch 38, pass through branch 39 and divide into the branches 39*a* and 39*b* so as to be impressed respectively, upon the analog frequency shift demodulating means 44 and the binary frequently shift receiving means 35, respectively. The analog frequency shift modulating means is designed to be controlled by signals in the frequency range from 2910 to 2970 c.p.s., while the binary frequency shift receiving means 35 is designed to receive and be controlled by two discrete frequency signals of either 2790 or 2850 c.p.s.

In the case of the analog frequency shift keying means, this provides the amplitude control for restoration or reconstruction of the original voice signals transmitted from a remote location (not shown) to the receive line 36 of the receive channel 4WR. It should be noted that signals as presented to one input of amplifier means 34 by the low pass filter means 43 are signals of constant amplitude representing only the phase information of the voice transmission. The gain of the variable output gain amplifying means 34 is controlled by the linear frequency shift keying means 44. Keying means 44 is designed to generate a varying signal the amplitude of which represents the dynamic frequency being received by the keying means 44. The chart of page 11, when read in reverse, substantially yields the corresponding performance of the analog frejuency shift keying means 44. This varying signal voltage is impressed upon the amplifier amplitude control means 34 and acts to bias the amplifier portion in order to restore the dynamic signal level of the voice signal which has been transmitted. The amplifier means 34 may be substituted by a constant gain amplifier having a vario-losser shunted across its input terminal with the vario-losser means being controlled by the output of keying means 44. This arrangement cuts down any distortion in the receive channel 2WR by a significant amount.

The incoming amplitude eliminated voice signals which pass through branch 39 and sub-branch 39*b* are impressed upon the input of the binary frequency shift keying means 35 when receiving the MARK frequency of 2850 c.p.s. This signal is impressed upon a second input of switch means 33 to open the switch 33*a* so as to remove the short-to-ground across the output of amplifier means 34. When the space frequency of 2790 c.p.s. is received, a no current condition exists at the output of keying means 35 causing the normally closed position of switch 33*a* to be maintained, thus keeping the output of amplifier means 34 shorted to ground potential.

The terminal 10 of FIG. 1 is so designed as can be seen from the description given here and above to transmit the voice frequencies in three separate portions with the first portion being of constant amplitude and representing the dynamic frequency of the voice signals; the second portion likewise being of constant amplitude and having a frequency representing the dynamic amplitude of the original voice signals; and the third portion thereof being a "binary" signal of either a first or second condition representative of either a send or no-send condition. These three portions of the information are combined and transmitted simultaneously and act to prevent the casual listener from deciphering these signals to any intelligible level without the benefit of the exact receive channel system provided herein. The frequency shift signals generated by keying means 29 and 31 are shown in FIG. 1 as being combined in mixer 25, but may, if desired, be transmitted through a separate channel with the final selection being dependent only upon the needs of the user.

In order to further enhance the privacy of the system of FIG. 1 the noise generator 45 may be provided which is so designed as to impress noise into the input of filter means 23, which signals are at an amplitude a few db below reference speech amplitude after the limiting operation. This arrangement provides continuous random transmission which is not coherent with the amplitude information transmitted separately. At the receiver the noise transmission would always be a few db lower than the voice transmission and thereby provide a substantially low loss of intelligibility. To the casual listener, however, not having the exact system employed herein, the presence of the noise signal completely masks the intelligence transmitted. This is so because in the absence of the noise generating means, the casual listener would be able to ascertain when voice transmission is initiated and terminated. With the noise generator 45, however, being constantly in operation, the casual listener would have no such benefits.

Figure 2:
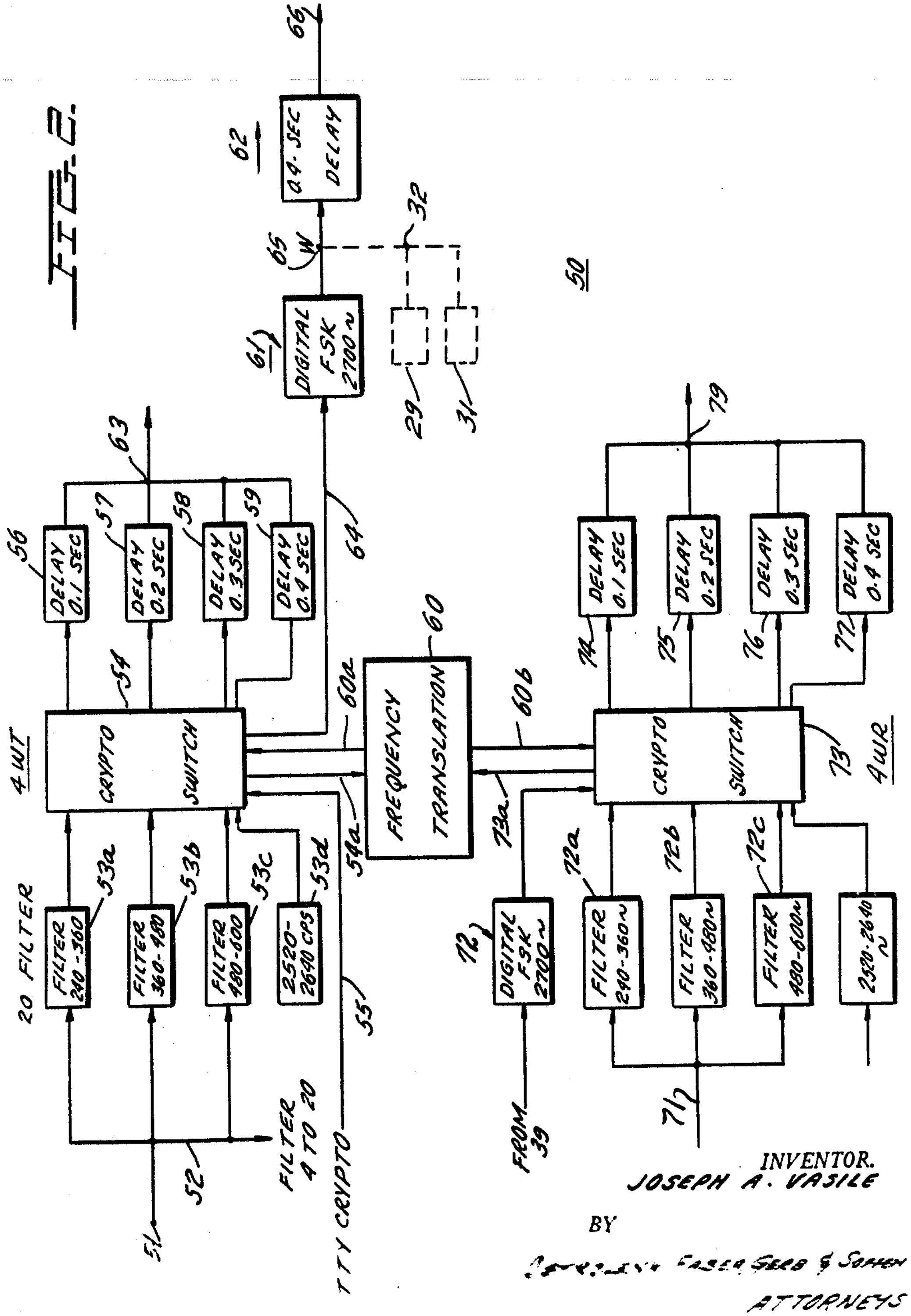
FIG. 2 is a block diagram showing a switch delay voice privacy system which may be employed with the terminal of FIG. 1.

FIG. 2 is a block diagram showing a switch delay voice privacy system 50, which may be used in conjunction with the terminal 10 of FIG. 1. The privacy system 50 is arranged to divide the voice band into twenty filtered segments, each having a band pass of 120 cycles. Combining the arrangement of FIG. 2 with the arrangement of FIG. 1, the input terminal 51 can be send channel 2WT in FIG. 2 and is connected to the output of amplifier means 16. This common terminal 51 is connected to a bus 52 which, in turn, connects the amplified voice signal from amplifier means 16 to the filter means 53a–53t. Filter 53a has a voice frequency range from 240 to 360 c.p.s., which it passes; filter means 53b has a band pass region from 360 c.p.s. to 480 c.p.s. and finally filter 53t has a band pass from 2520 to 2640 c.p.s. While twenty filters are employed, only four of the group have been shown for purposes of simplicity. The outputs of each of the filter means 53a–53t are impressed upon selected inputs of a cryto switch means 54 comprised of a prearranged gating means and adapted under control of an input control means, to impress the voice frequency ranges upon selected ones of the delay circuits 56–60, respectively, each of which have delays, respectively, of 0.1 to 0.5 seconds, which they impose upon the voice signals impressed upon the delay means. After the delay operation, the signals are combined at the common terminal 63 and then impressed upon the input terminal of the single sideband modulation means 17 of FIG. 1.

In a like manner, the privacy means for the receive channel 2WR is comprised of an input terminal 71, which connects the incoming encrypted voice signals to the inputs of the group of twenty filters 72a–72t, respectively. Filters 72a–72t are substantially identical in design and function to the filters 53a–53t, respectively. The outputs of the filters are impressed upon selected inputs of a crypto switch means 73, which is provided for the deciphering of the incoming encrypted signals. Switching means 73 is comprised of a plurality of switching gates which are controlled by predetermined signals for determining which of the delay circuits 74–77, the outputs of the filters 72a–72t will be impressed upon. After undergoing this deciphering delay operation, the signals are all combined at the common terminal 79, where they are impressed upon the input to amplifier means 34 of the receive channel 2WR of terminal 10 in FIG. 1.

Teletype encryption techniques are employed to switch the delays in a "random" fashion. The Teletype writer encrypto information is impressed upon the input terminal 55 of switch means 54 to select which of the delays the outputs of the filters 53a–53t will be imposed upon. It should be understood that each of the delay circuits 56–60 in the send channel 2WT actually represents five delay circuits at each of the delay times. Thus, there are five 0.1 second delay circuits 56; five 0.2 second delay circuits 57 and so forth, yielding a total of twenty delay circuits.

Another output of crypto switch means 54 is impressed upon the lead 64, which in turn connects the voice signal to the input of frequency shift keying means 61. The output of keying means 61 appears at the terminal 65. This terminal receives the two outputs which are summed at the terminal 32 of FIG. 1 and which represent the amplitude information and switching information of the terminal 10. This information is summed at the terminal 65 and impressed upon filter means 62 which imposes a 0.4 second delay upon these signals. The output thereof appears at 66 and is in turn impressed upon the input 25b of mixer 25, as shown in FIG. 1, thus completing the circuit connections between the send channels 4WT of FIGS. 1 and 2.

Turning to the receive channel 2WR of FIG. 2, the amplitude limited information appearing at the output of limiter 37 of FIG. 1 and on the line 39 is impressed upon the input of the digital phase shift keying means 78 in the receive channel. This signal is used to enable the operation of the crypto switch means 73 in order to indicate the presence of encrypted delay information.

If equipment complexity is economically tolerable and the privacy advantage to be derived therefrom is significant, the frequency translation may take place in both straight and inverted form by means of the frequency translation means 60 such that in the send channel 2WT the outputs of filters 53a–53t, are connected through a group of output terminals designated 54a of switch means 54 upon the frequency translation means 60, which performs frequency translation upon the information and returns it through the group of output terminals 60a through crypto switch means 54 for the purpose of randomly connecting the now translated frequency information upon selected ones of the twenty delay circuits 56–59, respectively, in a "random" fashion. The operation for the receive channel 2WR is similar with the output terminals of switch means 73 being connected through 73a to frequency translation means 60, which returns the frequency translated information through the outputs designated 60b back to crypto switch means 73 in order to go through the deciphering delay means 74–77, respectively.

The system of FIG. 1, in the absence of the switch delay voice privacy system of FIG. 2, provides the following advantages:

Approximately 23 db signal-to-noise advantage is derived through use of the terminal 10 since all voice components are transmitted at maximum amplitude permitted by the transmission equipment and the limiting operation substantially completely eliminates the effect of amplitude fading.

In the absence of the super-imposed noise generator means 45, a significant degree of privacy is available due to the fact that amplitude elimination effectively reduces articulation of the transmitted signals.

The use of the noise generator provides random noise transmission and thereby completely masks the voice intelligence transmission to intercepting listeners not equipped with the identical receiver facility.

Positive transmission path switching is obtainable both by reduction of the gain in receive amplifier means 34 by the analog frequency shift key or receiver means 44, which generates very low values in the absence of received speech and by the action of the binary frequency shift keying means 35, which causes the switch means 33 to create a short circuit condition across the amplifier means 34 output. These circuits combine to provide an almost infinite "Echo Margin." It is conceivable that the binary switching is redundant and for this reason it may be eliminated from the circuit. This thereby provides a wider band width for voice information transmission by allowing the voice transmission range to occupy the region previously occupied by the binary switching information signal.

Any attempt at jamming of the voice transmission which has an average amplitude of the desired signal, is ineffective because, like noise generator transmission, it would not be coherent with the analog frequency shift keying amplitude information transmission.

The terminal 10 of FIG. 1, when coupled with the switch delay voice privacy arrangement of FIG. 2, provides the following advantages:

The introduction of delay in the transmitted speech permits heavier loading of the transmitter (not shown), with consequent signal-to-noise ratio improvement of the receive signal at the distant receiving end. This is equivalent to delay diversity which provides advantages similar to space diversity or frequency diversity.

The switching of delays of the send channel 2WT by Teletype encryption techniques presents the interceptor with the same almost insuperable problems of deciphering as in encrypted Teletype.

By switching narrow band segments of speech through both direct and inverted translation, this further enhances the cryptographic effectiveness of the transmitted signals.

Voice recognition in the system combination between FIGS. 1 and 2 is not destroyed as in Vocoder systems which synthesize voice by means of hiss and buzz generators. The reconstructed voice signal in the instant invention is the original voice signal with amplitude distortion substantially less than that introduced by selective fading. Thus, cryptographic effectiveness is extremely good in the system of the instant invention while voice recognition is preserved.

The complexity of the system combination provided in FIGS. 1 and 2 herein is radically less than that of the Vocoder type systems.

Bandwidth requirements for the system of the instant invention are substantially less than for digital Vocoder systems.

Figure 3:
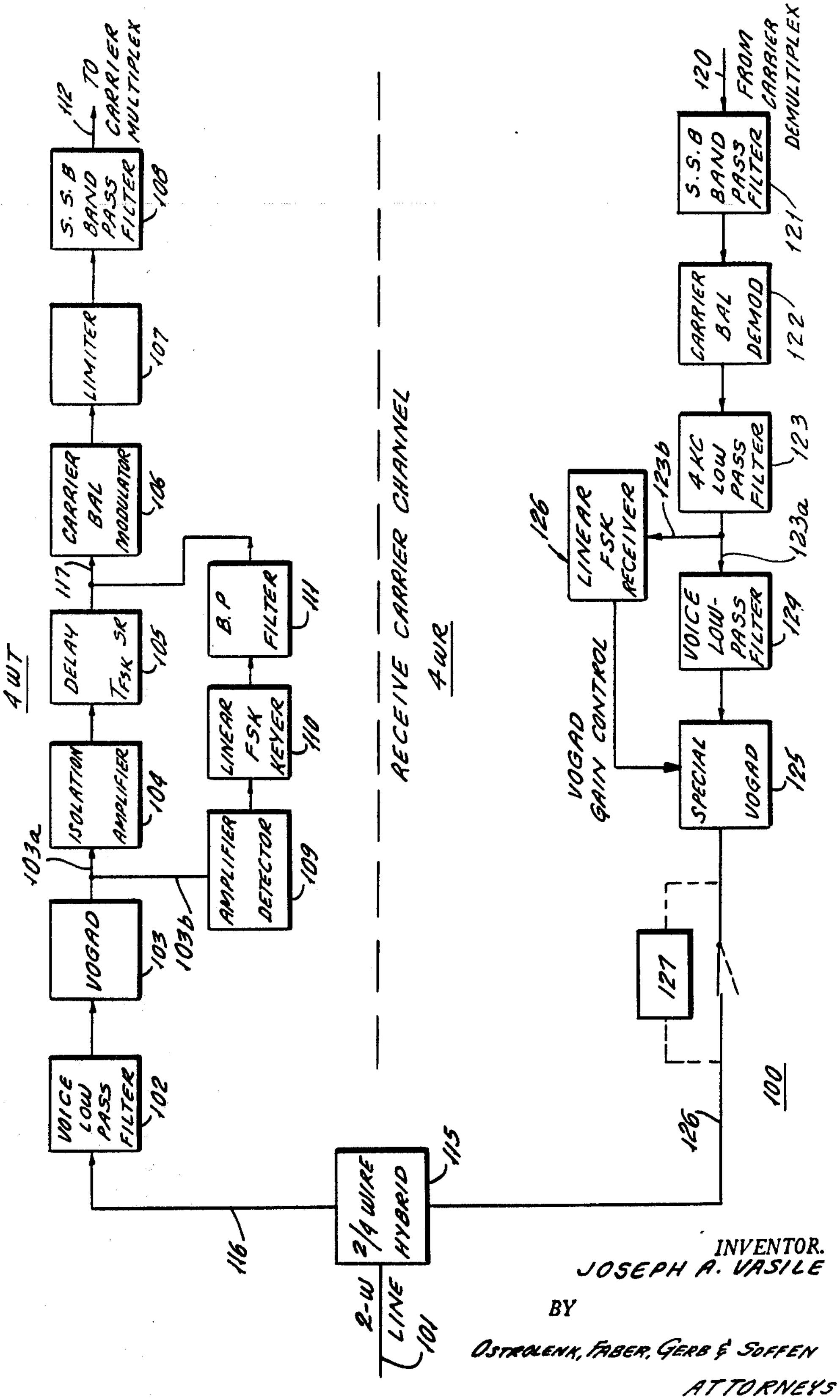
FIG. 3 shows a multiplex carrier systems application for the amplitude elimination and restoration portion of FIG. 1.

Referring now to FIG. 3, there is shown therein a carrier systems application employing the amplitude elimination and restoration system of the instant invention. In FIG. 3 there is shown therein a terminal 100 having a two-wire two-way line 101 connected to a send carrier channel 4WT and a receive carrier channel 4WR by the hybrid means 102. The basic arrangement shown in FIG. 3 substantially resembles the terminal 10 of FIG. 1. The circuits 106, 108 in the send channel 4WT and the circuits 121, 122, together with hybrid means 115, normally comprise a voice channel multiplex system arranged in twelve channel groups which are combined to form super groups of up to six hundred channels for application to coaxial or microwave wide band transmissions systems. For satisfactory transmission with the amplitude variations permitted over telephone circuits and a dynamic range required of approximately 30 db, noise on the transmission facility must be kept at a level above reference noise (—90 db with respect to one milliwatt or $10^{-12}$ watts) which does not exceed 50 db for open wire circuits and 40 db for cable circuits. Such values are considered noisy and 25 to 30 db less noisy circuits are presently in service. By establishing an amplitude reference at the input of the carrier channels and by employing the amplitude elimination and restoration technique of the instant invention, approximately 30 db of signal-to-noise ratio improvement can be effected. This would necessarily permit doubling or tripling the multiplex channel capacity of wide band transmission systems without any accompanying increase in transmission power requirements so long as the band width requirements are available.

The send carrier channel 4WT of terminal 100 is connected to the output 116 of hybrid means 115 for the receipt of voice signals from the two-wire line 101. These signals are impressed upon low pass filter means 102 which is designed to pass a band of voice frequencies which eliminates the analog frequency shift keying frequency which is chosen to transmit the amplitude information while passing the remaining portion of the voice frequency band. Amplifier means 103 which is a variable output gain amplifier receives the voice signals from the output of filter means 102 and amplifies the voice signals to establish a nominal reference at its output terminal which is selected to be optimum for the number of channels and the transmission system being employed. The output of amplifier means 103 divides into the branches 103*a* and 103*b*. Branch 103*a* impresses these signals upon an isolation amplifier means 104 and a delay means 105 which provides an amount of delay equal to the delay in the narrow band filters of the linear frequency shift keying means provided in the send and receive channels. The amplified and delayed signal is then impressed upon the carrier balanced modulator 106, which is used to drive the 30 db limiter circuit 107. Unwanted sideband and limiter circuit distortion products are then eliminated by the single sideband band pass filter means 108. Thus, the phase information of the voice signals is transmitted at constant amplitude at the output 112, which in turn is impressed upon suitable multiplex combining circuits (not shown).

The second branch 103*b* from amplifier means 103 is impressed upon amplifier detector means 109 and analog frequency shift keying means 110, which operates substantially in the same manner as the rectifier means 28 and linear frequency shift keying means 29, respectively, of FIG. 1. Basically, the operation is such that the dynamic amplitude information of the voice signals is converted to frequency shift information by means of keyer 110. The output frequency may lie substantially in the same identical range as the keyer 29 of FIG. 1 with the output frequency corresponding to input amplitude as given in the chart shown in column 6, which gives the radio telephone terminal application characteristics. The output of keyer means 110 passes through band pass filter means 111, where it is recombined with the phase information at 117 to operate the carrier balanced modulator 106 along with the constant amplitude voice signals representing the dynamic voice signal frequency.

In the receive channel, demodulation takes place in the normal manner. Incoming signals are impressed at the terminal 120 and undergo filtering by the band pass filter means 121, which in turn impresses the band pass output upon demodulation means 122. The output signals then pass through a low pass filter means 123, which passes those frequencies selected as the voice pass band in the send channel 4WT. These signals are impressed upon one input of the variable output gain amplifier means 125. The output branch 123*b* of filter means 123 is impressed upon analog frequency shift keying receiver means 126 which furnishes an amplified discriminated output signal which is impressed upon amplifier means 125 to control the gain of the receiving amplifier so as to correspond with the dynamic range of the amplitude variations in the amplifier means 102 of the send carrier channel. The output of receiving amplifier means 125 feeds the hybrid means 115 through output 126, which in turn connects the incoming reconstituted voice signals to the two-wire line 101.

The circuit 100 as presented may, instances of poor return loss on the two-wire line and high transmitting amplifier gain required for a weak or soft speaking talker, result in a substantially low "Echo Margin," thus leading to the possibility of objectionable echos or even oscillation around the loop. This may readily be resolved by limiting the output of receiver amplifier 125 to amplitudes 10 to 15 db below reference output relative to the send channel amplifier 102. As an alternative, a circuit 127 may be inserted in the line 126 to insert a variable loss between the receive channel amplifier 125 and the hybrid means 115 which corresponds to gains in the transmitting channel amplifier 102 above predetermined amounts. As another alternative, the digital switching means of terminal 10 of FIG. 1 may be substituted in order to provide a suitable "Echo Margin."

The use of amplitude elimination and restoration system of the instant invention in a multiplexing system enables channel capacity to be increased by a factor of two or three because base band noise requirements can be relaxed by 20 db or more.

Cross-talk becomes less noticeable because it is not coherent with channel amplitude transmission information.

Satellite communications transmission equipment can be implemented with less power and less sophisticated receving terminal equipment, when using the system of the instant invention.

Uniform voice transmission performance can be achieved by delivering reference amplitudes to the transmission system and receiving reference amplitudes on the subscriber line.

The undesirable echo effects of long transmission paths can virtually be eliminated.

It can therefore be seen that the instant invention provides a novel amplitude elimination and restoration communications system which guarantees extremely high system privacy, exhibits extremely large effective power gains, provides optimum loading upon the receiver facility, and in multiplex applications enables channel capacity to be greatly increased.

Although there has been described a preferred embodiment of his novel invention, many variations and modifications will now be apparent to those skilled in the art. Therefore, this invention is to be limited, not by the specific disclosure herein, but only by the appending claims.

What is claimed is:

1. Terminal means for radio telephone links and the like comprising send channel means for transmitting voice signals, said send channel being comprised of first means for amplifying said voice signals; second means for modulating operating at a predetermined center frequency; said second means having means for modulating said center frequency by said voice signals; third means for converting the output of said second means into a modulated signal having constant amplitude; fourth means for demodulating the output of said third means about said predetermined center frequency; fifth means for converting the output of said first means into a frequency varying signal, the frequency of said frequency varying signal being controlled by the amplitude of said first means output signal; means for combining the output signals of said fourth means and said fifth means.

2. A transmit channel for converting voice signals at a first location preparatory to wireless transmission to a remote location comprising first means having input means for receiving voice signals; said first means amplifying said voice signals; second means receiving said amplified voice signals for generating first constant amplitude variable frequency output signals, the frequency of said first output signals being controlled by the frequency of said voice signals; third means receiving said amplified voice signals for generating second constant amplitude variable frequency output signals, the frequency of said second output signals being controlled by and linearly related the amplitude of said voice signals to assume any frequency value within a predetermined frequency range; fourth means for combining the output signals of said second and third means for transmission to said remote location.

3. A transmit channel for converting voice signals preparatory to wireless transmission comprising first means having input means for receiving voice signals; said first means amplifying said voice signals; second means receiving said amplified voice singals for generating first constant amplitude variable freqeuncy output signals, the frequency of said first output signals being controlled by the frequency of said voice signals; third means receiving said amplified voice signals for generating first constant amplitude variable frequency output signals, the frequency of said second output signals being controlled by the amplitude of said voice signals; fourth means for combining said first and second output signals for transmission over a suitable wireless facility.

4. A transmit channel for converting voice signals at a first location preparatory to wireless transmission to a remote location comprising first means having input means for receiving voice signals; said first means amplifying said voice signals; second means receiving said amplified voice signals for generating first constant amplitude variable frequency output signals, the frequency of said first output signals being controlled by the frequency of said voice signals; third means receiving said amplified voice signals for generating second constant amplitude variable frequency output signals, the frequency of said second output signals being controlled by the amplitude of said voice signals to assume any frequency value within a predetermined frequency range; fourth means for simultaneously transmitting said first and second output signals over separate transmission channels to said second location.

5. A transmit channel for converting voice signals at a first location preparatory to wireless transmission to a remote location comprising first means having input means for receiving voice signals; said first means amplifying said voice signals; second means receiving said amplified voice signals for generating first constant amplitude variable frequency output signals, the frequency of said first output signals being controlled by the frequency of said voice singals; third means receiving said amplified voice signals for generating second constant amplitude variable frequency output signals, the frequency of said second output signals being controlled by and linearly related to the amplitude of said vice signals fourth means for combining the output signals of said second and third means for transmission to said remote location; said second means comprising means for modulating a carrier signal with said amplified voice signals; band-pass filter means for passing only one side band generated by said modulating means; means for amplitude limiting said frequency demodulated signals to generate said first output signals; means for combining first and second output signals; means for transmitting said combined signals to the second location; means for frequency demodulating the frequency band passed by said band-pass filter means.

6. A transmit channel for converting voice signals preparatory to wireless transmission comprising first means having input means for receiving voice signals; said first means amplifying said voice signals; second means receiving said amplied voice signals for generating first constant amplitude variable frequency output signals, the frequency of said first output signal being controlled by the frequency of said voice signals; third means receiving said amplified voice signals for generating second constant amplitude variable frequency output signals, the frequency of said second output signals being controlled by and linearly related to the amplitude of said voice signals; said third means comprising linear frequency shift keying means for frequency modulating a carrier signal having a frequency which changes linearly with amplitude changes of said voice signals; means for combining first and second output signals; means for transmitting said combined signals to the second location.

7. A transmit channel for converting voice signals preparatory to wireless transmission comprising first means having input means for receiving voice signals; said first means amplifying said voice signals; second means receiving said amplified voice signals for generating first constant amplitude variable frequency output signals, the frequency of said first output signals being controlled by the frequency of said voice signals; third means receiving said amplified voice signals for generating second constant amplitude variable frequency output signals, the frequency of said second output signals being controlled by and linearly related to the amplitude of said voice signals; said third means comprising linear frequency shift keying means for frequency modulating a carrier frequency under control of and linearly related to the amplitude of said voice signals; said third means further comprising means connected between said amplifier means and said frequency shift keying means for rectifying said voice signals preparatory to entering said frequency shift keying means; means for combining first and second output signals; means for transmitting said combined signals to the second location.

8. A transit channel for converting voice signals preparatory to wireless transmission comprising first means having input means for receiving voice signals; said first means amplifying said voice signals; second means receiving said amplified voice signals for generating first constant amplitude variable frequency output signals, the frequency of said first output signals being controlled by the frequency of said voice signals; third means receiving said amplified voice signals for generating second constant amplitude variable frequency output signals, the frequency of said second output signals being controlled by and linearly related to the amplitude of said voice signals; said third means comprising linear frequency shift keying means for frequency modulating a carrier signal having a frequency under control of and linearly related to the amplitude of said voice signals; fourth means for receiving said voice signals comprising fifth means normally generating a conditioning signal of a first predetermined frequency, indicative of the absence of voice signals in the transmit channel; said fifth means generating a signal of a second predetermined frequency when said voice signal achieves a predetermined threshold level.

9. A transmit channel for converting voice signals preparatory to wireless transmission comprising first means having input means for receiving voice signals; said first means amplifying said voice signals; second means receiving said amplified voice signals for generating first constant amplitude variable frequency output signals, the frequency of said first output signals being controlled by the frequency of said voice signals; third means receiving said amplified voice signals for generating second constant amplitude variable frequency output signals, the frequency of said second output signals being controlled by the amplitude of said voice signals; said third means comprising frequency shift keying means for frequency modulating a carrier frequency under control of the amplitude of said voice signals; fourth means for receiving said voice signals comprising fifth means normally generating a conditioning signal of a first predetermined frequency, indicative of the absence of voice signals in the transmit channel; said fifth means generating a signal of a second predetermined frequency when said voice signal achieves a predetermined threshold level; means for combining said first and second output signals and the output of said fifth means; means for transmitting said combined signals to a remote location; said first and second output signals lying in different frequency ranges.

10. A transmit channel for converting voice signals preparatory to wireless transmission comprising first means having input means for receiving voice signals; said first means amplifying said voice signals; second means receiving said amplified voice signals for generating first constant amplitude variable frequency output signals, the frequency of said first output signals being controlled by the frequency of said voice signals; third means receiving said amplified voice signals for generating second constant amplitude variable frequency output signals, the frequency of said second output signals being controlled by the amplitude of said voice signals; said third means comprising frequency shift keying means for frequency modulating a carrier frequency under control of the amplitude of said voice signals; fourth means for receiving said voice signals comprising fifth means normally generating a conditioning signal of a first predetermined frequency, indicative of the absence of voice signals in the transmit channel; said fifth means generating a signal of a second predetermined frequency when said voice signal achieves a predetermined threshold level, means for combining said first and second output signals and the output of said fifth means; means for transmitting said combined signals to a remote location; said first and second output signals lying in different frequency ranges; said conditioning signals lying in a frequency band different from the frequency bands of said first and second output signals.

11. Terminal means providing an interface between a two-wire facility and a four wire facility comprising a send channel and a receive channel for said four-wire facility; hybrid means for connecting said send and receive channels to said two-wire facility; said send channel being of the type described in claim 2.

12. A receive channel for converting encoded voice signals preparatory to presentment to a two-wire facility wherein said encoded voice signals being of constant amplitude and lying in first and second differing frequency bands, said first band containing voice frequency information and said second band containing voice amplitude information said channel comprising first means for receiving wireless transmitted encoded voice signals; second means connected to said first means for amplifying said encoded signals; third means connected to said second means and responsive to only those signals within said first frequency band for generating a first output signal having constant amplitude and variable frequency with the frequency of said first output signal being controlled by the frequency of incoming signals in said first frequency band; fourth means connected to said second means and responsive to only those incoming signals lying in said second frequency band for generating an analog voltage output, the amplitude of said analog voltage being controlled by the frequency of signals in said second frequency band.

13. A receive channel for converting encoded voice signals preparatory to presentment to a two-wire two-way facility, said encoded voice signals being of constant amplitude and lying in first and second differing frequency bands, said first band containing voice frequency information and said second band containing voice amplitude information said channel comprising first means for receiving wireless transmitted encoded voice signals; second means connected to said first means for amplifying said encoded signals; third means connected to said second means and responsive to said first frequency band for generating a first output signal having constant amplitude and variable frequency with the frequency of said first output signal being controlled by the frequency of incoming signals in said first frequency band; fourth means connected to said second means and responsive to incoming signals in said second frequency band for generating an analog voltage output, the amplitude of said analog voltage being controlled by the frequency of said second frequency band signals; fifth means connected to said third and fourth means for generating a reconstructed voice signal; the frequency of said reconstructed voice signal being controlled by said third means and the amplitude of said reconstructed voice signal being controlled by said four means; said fifth means coupling said reconstructed signal to said two-wire facility.

14. The terminal means of claim 11 wherein said receive channel is comprised of first means for receiving wireless transmitted encoded voice signals comprised of constant amplitude-frequency signals lying in first and second differing frequency bands; second means connected to said first means for amplifying said encoded signals; third means connected to said second means and responsive to signals in said first frequency band for generating a first output signal having constant amplitude and variable frequency, the frequency of said first output signal being controlled by the frequency of incoming signals in said first frequency band; fourth means connected to said second means and responsive to incoming signals in said second frequency band for generating an analog voltage output, the amplitude of said analog voltage being controlled by the frequency of said second frequency band signals, said fourth means further comprising means receiving the output of said fourth means for restoring the amplitude of the output signals produced thereby to present decoded voice signals to said two-wire facility.

15. A receive channel for converting encoded voice signals preparatory to presentment to a two-wire two-way facility, said encoded voice signals being of constant amplitude and lying in first and second frequency bands said first band containing voice frequency information and said second band containing voice amplitude information said channel comprising first means for receiving wireless transmitted encoded voice signals; second means connected to said first means for amplifying said encoded signals; third means connected to said second means and responsive to said first frequency band for generating a first output signal having constant amplitude and variable frequency with the frequency of said first output signal being controlled by the frequency of incoming signals in said first frequency band; fourth means connected to said second means and responsive to incoming signals in said second frequency band for generating an analog voltage output, the amplitude of said analog voltage being controlled by the frequency of said second frequency band signals; said fourth means further comprising means receiving the output of said fourth means for restoring the amplitude of the output signals produced thereby to present decoded voice signals to said two-wire facility; control means connected to the output of said first means for disabling said receive channel when the voice signals at the output of said fourth means achieves a predetermined threshold level.

16. Terminal means for radio-telephone links and the like comprising send channel means for transmitting voice signals to a remote location, said send channel being comprised of:

first means for amplifying said voice signals;

second means coupled to said first means for delaying said amplified voice signals by an amount related to the frequency of said voice signals;

third means coupled to said first means for generating an output signal whose frequency is linearly related to the amplitude of said amplified voice signals;

fourth means for combining the outputs of said second and third means;

fifth means coupled to said fourth means for generating a modulated carrier signal modulated by the output of said fourth means;

sixth means for limiting the amplitude of the output signals of said fifth means;

seventh band-pass filter means for passing one sideband of said sixth means output signals for transmission to a remote location.

17. The device of claim 2, further comprising means for encrypting voice signals preparatory to transmission coupled between said amplifying means and said second means and comprising input means for receiving voice signals; a plurality of filter means each passing different frequency bands; means connecting the inputs of said filter means to said input means; a plurality of delay means each having different delay periods; gating means for selectively connecting said filter means to said delay means in predetermined combinations; means for altering the connections, established by said gating means to provide a random arrangement.

18. The device of claim 2 further comprising for decrypting voice signals preparatory to impression upon a voice channel being coupled between said first means and said third and fourth means and comprising means for receiving encrypted voice signals; a plurality of delay means having different delay periods; means for impressing said encrypted voice signals upon the inputs of said delay means; a plurality of filter means each passing different frequency bands; gating means for selectively connecting said delay means to said filter means in predetermined combinations; means for altering the connections established by said gating means to provide a random arrangement.

References Cited

UNITED STATES PATENTS

| | | | |
|---|---|---|---|
| 2,007,416 | 7/1935 | Affel | 325—50 |
| 2,411,683 | 11/1946 | Guanella | 179—1.5 |
| 2,632,101 | 3/1953 | Quarles | 325—61 |
| 3,174,100 | 3/1965 | Orr | 325—5 |

RODNEY D. BENNETT, JR., Primary Examiner

J. P. MORRIS, Assistant Examiner

U.S. Cl. X.R.

325—61